US009144015B2

(12) United States Patent
Johansson et al.

(10) Patent No.: US 9,144,015 B2
(45) Date of Patent: Sep. 22, 2015

(54) METHODS OF UE INDICATING TRAFFIC-RELATED INFORMATION TO NETWORK

(71) Applicant: MEDIATEK, Inc., Hsin-Chu (TW)

(72) Inventors: Per Johan Mikael Johansson, Kungsangen (SE); Chia-Chun Hsu, Taipei (TW)

(73) Assignee: MEDIATEK INC. (TW)

( * ) Notice: Subject to any disclaimer, the term of this patent is extended or adjusted under 35 U.S.C. 154(b) by 465 days.

(21) Appl. No.: 13/644,048

(22) Filed: Oct. 3, 2012

(65) Prior Publication Data

US 2014/0092733 A1 Apr. 3, 2014

(51) Int. Cl.
*H04W 52/02* (2009.01)
*H04W 80/04* (2009.01)
*H04W 88/06* (2009.01)
*H04W 88/08* (2009.01)

(52) U.S. Cl.
CPC ............ *H04W 52/0216* (2013.01); *Y02B 60/50* (2013.01)

(58) Field of Classification Search
CPC . H04W 52/02; H04W 52/0216; H04W 80/04; H04W 88/06; H04W 88/08
USPC .................................................. 370/311, 328
See application file for complete search history.

(56) References Cited

U.S. PATENT DOCUMENTS

| 8,731,563 | B2 | 5/2014 | Yi .................................. 455/437 |
| 2009/0002147 | A1 | 1/2009 | Bloebaum et al. ............ 340/466 |
| 2009/0093281 | A1 | 4/2009 | Demirhan et al. ............ 455/574 |
| 2009/0318131 | A1 | 12/2009 | Aaron ............................ 455/423 |
| 2010/0103829 | A1* | 4/2010 | Murzeau et al. .............. 370/252 |
| 2010/0302946 | A1* | 12/2010 | Yang et al. ..................... 370/235 |
| 2011/0039568 | A1 | 2/2011 | Zhang et al. ................ 455/452.1 |
| 2011/0185052 | A1 | 7/2011 | Nakahira ....................... 709/223 |
| 2011/0199992 | A1* | 8/2011 | Barker et al. ................. 370/329 |
| 2011/0255492 | A1 | 10/2011 | Dai et al. ....................... 370/329 |
| 2012/0093106 | A1 | 4/2012 | Dong ............................ 370/329 |

(Continued)

FOREIGN PATENT DOCUMENTS

| CN | 1738481 A | 2/2006 |
| CN | 101409928 A | 4/2009 |

(Continued)

OTHER PUBLICATIONS

EPO, Search Report of Europe patent application 12006890 dated Apr. 4, 2013 (11 pages).

(Continued)

*Primary Examiner* — Ronald B Abelson
(74) *Attorney, Agent, or Firm* — Imperium Patent Works; Zheng Jin; Helen Mao (57) ABSTRACT

A method of user equipment (UE) indication of traffic-related information to network is provided. The method comprises a UE determining a traffic indicator and transmitting the traffic indicator to a base station. In one embodiment, the traffic indicator indicates either that default power consumption is preferred or low power consumption is preferred. For example, when the UE is in background traffic or sparse traffic, low power consumption is preferred. In another embodiment, the traffic indicator indicates a time pattern of the traffic history. From the network perspective, upon receiving and evaluating information contained in the traffic indicator, the network triggers a QoS modification procedure by applying one or more QoS modification algorithms.

10 Claims, 10 Drawing Sheets

(56) References Cited

U.S. PATENT DOCUMENTS

2012/0300716 A1  11/2012  Jersenius et al. ............. 370/329
2013/0215809 A1   8/2013  Chang et al. ................. 370/311

FOREIGN PATENT DOCUMENTS

| CN | 101919226 A    | 12/2010 |
| CN | 101980575 A    | 2/2011  |
| EP | 2117250 A1     | 1/2007  |
| EP | 1981225 A1     | 10/2008 |
| EP | 2416537 A1     | 2/2012  |
| WO | WO2005050851   | 6/2005  |
| WO | WO2007024120   | 3/2007  |
| WO | WO2009058069 A1| 11/2007 |
| WO | WO2009045139 A1| 4/2009  |
| WO | WO2010081384 A1| 7/2010  |

OTHER PUBLICATIONS

R2-083553, 3GPP TSG RAN WG2 #62bis, Huawei, "Consideration on Mobility State Detection Criteria in Active Mode", Warsaw, Poland, Jun. 30-Jul. 4, 2008 (10 pages).

R2-113181, 3GPP TSG-RAN WG2 Meeting #74, Alcatel-Lucent Shanghai Bell, Alcatel-lucent, "Discussion on Mobility Estimation for HetNet", Barcelona, Spain, May 9-13, 2011 (4 pages).

3GPP TS 36.331 Version 9.7.0. Release 9, LTE, Evolved Universal Terrestrial Radio Access (E-UTRA), Radio Resource Control (RRC), Jul. 2011, section 5.5.6.2 on p. 82.

International Search Report and Written Opinion of International Search Authority for PCT/CN2012/082553 dated Jan. 17, 2013 (9 pages).

International Search Report and Written Opinion of International Search Authority for PCT/CN2012/082568 dated Jan. 17, 2013 (10pages).

International Search Report and Written Opinion of International Search Authority for PCT/CN2012/082560 dated Jan. 17, 2013 (13pages).

The EPO Office Action of EP patent application EP12006891 dated Dec. 17, 2012 (11 pages).

3GGP TS 36.300 version 10.4.0 Release 10, LTE, Evolved Universal Terrestrial Radio Access (E-UTRA) and Evolved Universal Terrestrial Radio Access Network (E-UTRAN), Overall description, Stage 2, dated Jun. 2011(208 pages). pp. 43-44(Section 5.2.3), p. 55 (Section 7.2), pp. 93-97 (Section 11.1.2 to Section 12).

IEEE Std 802.11, Part 11: Wireless Lan Medium Access Control (MAC) and Physical Layer (PHY) Specifications, Jun. 2007, the whole document.

USPTO, Office Action for related U.S. Appl. No. 13/644,077 dated Jan. 20, 2015 (12 pages).

USPTO, Office Action for related U.S. Appl. No. 13/644,065 dated May 8, 2015 (12 pages).

USPTO, Office Action for related U.S. Appl. No. 13/644,077 dated May 12, 2015 (18 pages).

* cited by examiner

METHODS OF UE INDICATING TRAFFIC-RELATED INFORMATION TO NETWORK

CROSS REFERENCE TO RELATED APPLICATIONS

This application claims priority under 35 U.S.C. §119 from U.S. Provisional Application No. 61/542,398, entitled "Radio Access Enhancements for Interactive Application Traffic," filed on Oct. 3, 2011, the subject matter of which is incorporated herein by reference.

TECHNICAL FIELD

The disclosed embodiments relate generally to mobile communication networks, and, more particularly, to UE providing traffic-related information and speed information to the network and triggering scheduling request based on traffic.

BACKGROUND

The exponential growth of mobile subscribers requires substantial increase of network capacity. Currently, network congestion is problematic on many third generation (3G) networks in a number of markets throughout United States and the world. The congested network causes dropped or failed calls, lower data rates and slow response times. Concurrent with this problem of rapid growth of number of users, there has been a rapid uptake of Smartphone subscribers, such as iPhone, Android phone and Blackberry phone users.

Long-term evolution (LTE) system, which offers high peak data rates, low latency and improved system capacity, is adopted by many operators to address the capacity issue. In the LTE system, an evolved universal terrestrial radio access network (E-UTRAN) includes a plurality of evolved Node-Bs (eNBs) communicating with a plurality of mobile stations, referred as user equipment (UE), via LTE-Uu interface. The radio access network further connects with a core network (CN), which includes Mobility Management Entity (MME), Serving Gateway (S-GW), and Packet data Network Gateway (P-GW), to provide end-to-end services.

While LTE network increases system capacity, it is projected that LTE network may soon face capacity problems. In both traditional network and LTE, operators always prioritize real-time voice traffic over data traffic. Resources are held in reserve across the network for circuit-switched voice traffic. New wireless data network, such as 3G and LTE network, also optimizes support for large amount of data traffic, such as video conferencing. Such design, however, does not work well for applications with short, infrequent data sessions, such as chatty applications and keep alive messages. Many common applications such as news, weather, and social networking, periodically connect and disconnect to/from the network for updates. These applications contain small amount of user data while still require a large amount of signaling traffic to establish and tear down the session. It is estimated that with the growing number of Smartphone applications over the network, the signaling overhead outpaces the data traffic by 30% to 50%, if not higher. Therefore, using data network efficiently is essential to improve network capacity.

Besides improving network efficiency, maintaining quality of service (QoS) is an important area for the successful growth of wireless networks. Applications over the wireless network have various requirements in terms of delay, bandwidth and error rate that they desire for optimal performance or user experience. The LTE system has defined a set of QoS Class Identifier (QCI) values, each corresponding to characteristics of a service required. The goal of standardizing QCI values is to ensure that applications/services mapping to the same QCI receive the same minimum level of QoS in multi-vendor network deployments, as well as in roaming cases. In the access network, it is the responsibility of the eNBs to ensure the necessary QoS for a bearer over the radio interface. Each bearer has an associated QCI, and Allocation and Retention Priority (ARP).

Traditionally, one application associates with one QoS because it has a predefined QoS requirement. Unlike traditional applications, for today's popular interactive applications, the QoS requirement is dynamic in nature. Many Smartphone applications generate traffic regularly even when the Smartphone is in background mode, such as when the user is not actively using the device. It is, therefore, desirable to have different QoS associates with one application. For example, the system can associate one QoS with a running application when the user is in interactive mode, and lower the QoS requirement when the user is not using the device. Such dynamic QoS scheme allows the system to reduce resource usage for the background applications, resulting in lower core network signaling overhead and improved LTE-Uu efficiency. On the UE side, it lowers the UE power consumption, primarily by allowing UE to use sleep cycles to greater extent, where hardware can be turned off or in standby mode. Usage of long sleep cycles or long DRX affects the QoS performance by introducing additional latency.

In addition to rapidly increased data and signaling volume that puts pressure on LTE-Uu interface, the amount of signaling to the Core Network is also a major concern of the operators. Operators have strong hope that LTE will efficiently support real "always-on", which enables application updates. Such feature may lead to most UEs being in connected mode, which is quite different from today's wireless network. Especially for Smartphone, operators need to keep the core network load in control. The majority overhead in the Core Network signaling is due to initial connection establishments. We note also that while keeping a UE always in connected mode reduces the signaling needed for connection setup, it would generates instead additional signaling for handover, and furthermore using long DRX in connected mode for good battery consumption comes with the drawback of bad handover performance, due to low UE measurement periodicity of neighbor cells in long DRX. Thus, the problem of controlling and optimizing network signaling, resource usage and UE battery consumption for typical smart phones is complex. To reduce the overhead of initial setup, the network could be assisted in identifying "tricky" UEs, which utilizes "always-on" services, is moving, and frequently switches between Idle and connected modes. An efficient way of identify such UE enables operator to apply special algorithms with high complexity to such UEs to reduce the Core Network traffic, while applying simpler algorithms to non-problematic UEs.

In light of the exploding growth of the amount of mobile data and various mobile applications, coupled with the wide adoption of LTE by wireless network operators, it becomes important to find ways to improve network efficiency and to maintain the QoS of various applications. The embodiments of the present invention address various areas such as improving LTE-Uu interface efficiency, lowering Core Network signaling overhead and lower UE battery consumption.

SUMMARY

In a first novel aspect, a method for a user equipment (UE) to indicate traffic-related information to a network is proposed. The method comprises determining a traffic indicator and transmitting the traffic indicator to a base station.

In one embodiment, the traffic indicator indicates either that a default power consumption is preferred or a low power consumption is preferred. For example, when the UE is in background traffic, low power consumption is preferred. The detecting of background traffic involves at least one of detecting background traffic of a specific application, activating of UE screen power saving, a running application is not shown on UE screen, and detecting no interaction from users.

In another embodiment, the traffic indicator indicates a time pattern of the traffic history. In one example, the traffic indicator comprises a history of time-periods when the UE was in RRC_IDLE mode or in RRC_CONNECTED mode. In another example, the traffic indicator comprises a count of transactions between RRC_IDLE mode and RRC_CONNECTED mode. In yet another example, the traffic indicator comprises a history of packet inter-arrival times and packet sizes for a radio bearer or a group of radio bearers. The UE may transmit the traffic indicator to the base station at RRC connection establishment, at RRC connection re-establishment, or when the UE changes cell.

From the network perspective, upon receiving and evaluating information contained in the traffic indicator, the network triggers a QoS modification procedure by applying one or more QoS modification algorithms. In one example, the one or more QoS modification algorithms comprise at least one of reducing QoS requirement, reducing scheduling priority, setting longer DRX cycle, configuring sparse or no uplink resources, and ordering the UE to go to RRC_IDLE mode.

In a second novel aspect, a method of determining a modified scheduling request trigger based on detected traffic condition is provided. The method comprises detecting a traffic condition that indicates whether the UE is in a background traffic mode in RRC_CONNECTED state, determining a modified scheduling request (SR) trigger based on the traffic condition, and transmitting a scheduling request to a base station based on the modified SR trigger. The scheduling request is transmitted via a physical uplink channel (PUCCH) or a random access channel (RACH).

In one embodiment, the modified SR trigger is a data buffer or a data generation rate exceeding a threshold. In one embodiment, the threshold is determined by the UE based on a QoS requirement that is related to a prioritized Bit Rate (PBR) or a bucket Size Duration (BSD) or both. In another embodiment, the threshold is configured by the base station based on a size of the smallest grant under the traffic condition.

In one advantageous aspect, the method comprises detecting a traffic condition, wherein the UE is configured for DRX mode and wherein the traffic conduction indicates whether the UE is in DRX sleep time. The UE determines a modified scheduling request trigger based on the detected DRX state and then transmits a scheduling request via PUCCH or RACH.

In one embodiment, the threshold used in modified SR trigger is updated when the detected DRX state changes. In another embodiment, the modified SR trigger is applying a longer SR period for a logic during DRX sleep time. In another embodiment, the modified SR trigger is stop SR during DRX sleep time.

In a third novel aspect, a method of UE providing speed information to network is provided. The method supports obtaining speed information of the UE, detecting a trigger event and providing the speed information to the network by one or more predefined means. The speed information is taken from the group consisting of a physical speed, a physical speed mapped on a pre-defined speed group, and a virtual speed. The virtual speed comprises a cell change count or a number of cells that the UE has requested for RRC connection during a certain period. The UE can send the speed information to an eNB via a RRC connection establishment, a RRC connection re-establishment, a new IE in RRC measurement report, or a new RRC message.

In one embodiment, the trigger event is the UE changes from RRC_IDEL state to RRC_CONNECTED state. In another embodiment, the trigger event is the detecting of background traffic mode in RRC_CONNECTED state. In another embodiment, the trigger event is an expiration of a periodic timer or an expiration of the periodic timer when UE is in background traffic mode.

In one embodiment, the trigger event is the UE detecting a speed exceeding a speed threshold. In another embodiment, the trigger event is UE detecting a speed exceeding a speed threshold when UE is in background traffic mode. In yet another embodiment, the trigger event is throttled by a prohibit timer to limit signaling overhead, where no speed information is sent by the UE until the prohibit timer expires.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
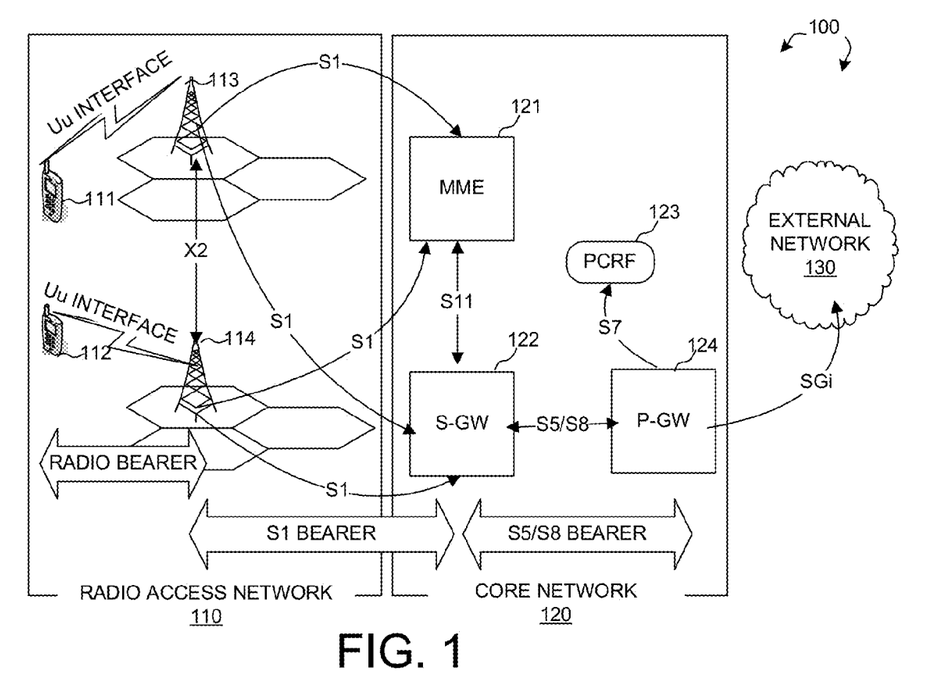
FIG. 1 schematically shows a diagram of a wireless communication system in accordance with embodiments of the invention.

FIG. 1 schematically shows a diagram of a wireless communication system in accordance with embodiments of the invention. Wireless System 100 includes a radio access network 110, a core network 120 and an external network 130. UE 111 and UE 112 connect to eNB 113 and eNB 114 respectively via radio interface. eNB 113 and eNB 114 connect via X2 interface. In accordance with embodiments of the invention, when UE 111 hands over from eNB 113 to eNB 114, eNB 113 forwards relevant UE 111 information to eNB 114 via the X2 interface. eNB 113 and eNB 114 connect with Mobility Management Entity (MME) 121 and Serving Gateway (S-GW) 122 via S1 interfaces. MME 121 connects with S-GW 122 via S11 interface. S-GW 122 further connects with P-GW 124 via S5/S8 interface. P-GW 124 connects Policy and Charging Rule Function (PCRF) 123 via S7 interface. PCRF 123 controls network QoS functions. In accordance with embodiments of the invention, entities such as P-GW 124 collect traffic information. PCRF 123 makes certain QoS modification accordingly. P-GW 124 connects with external network 130 via SGi interface. FIG. 1 further shows LTE bearer path. Both the UE and the network can initiate a bearer setup. An end-to-end bearer for a LTE channel includes a radio bearer 141 that connects UEs and eNBs, an S1 bearer 142 that connects eNBs to MME 121 or S-GW 122, and an S5/S8 bearer 143 that connects S-GW 122 to P-GW 124.

Figure 2:
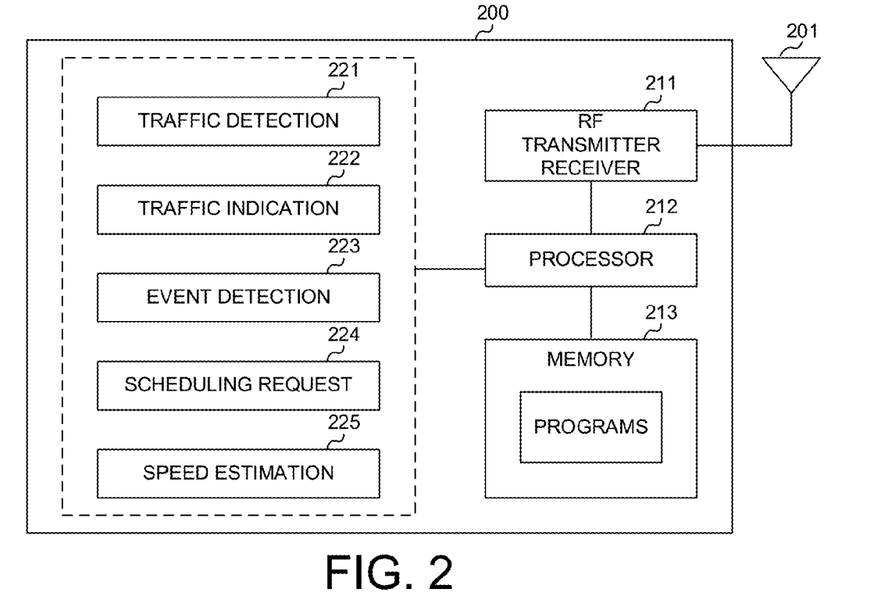
FIG. 2 shows a block diagram of a UE and its different function modules in accordance with embodiments of the invention.

FIG. 2 shows an exemplary block diagram of UE 200 that supports some embodiments of the present invention. Antenna 201 transmits and receives RF signals. RF transceiver module 211, coupled with antenna 201, receives RF signals from antenna 201, converts them to baseband signals and sends them to processor 212. RF transceiver 211 also converts received baseband signals from the processor 212, converts them to RF signals, and sends out to antenna 201. Processor 212 processes the received baseband signals and invokes different functional modules to perform features in UE 200. Memory 213 stores program instructions and data to control the operations of UE 200.

FIG. 2 also shows five functional modules 221, 222, 223, 224 and 225, which carry out embodiments of the present invention. Traffic detection module 221 detects traffic conditions in UE 200. Traffic indication module 222 evaluates various traffic conditions and other information in UE 200 and decides to set or update some traffic indicators. Event detection module 223 detects some predefined event triggers. UE 200 triggers corresponding actions based on the event triggers detected by event detection module 223. Scheduling Request (SR) module 224 carries out the function of sending SR to an eNB. In accordance to one embodiment of the invention, SR module 224 carries out a modified SR trigger for Scheduling Request. Such modified algorithm is triggered by predefined traffic condition in the UE. Speed estimation module 225 collects speed information and estimates UE speed. Such speed information can be used by either UE 200 or an eNB.

Similar configuration exists in an eNB where one or more antennae transmits and receives RF signals. RF transceiver module, coupled with the antennae, receives RF signals from the antenna, converts them to baseband signals and sends them to a processor. The RF transceiver also converts received baseband signals from the processor, converts them to RF signals, and sends out to the antennae. The processor processes the received baseband signals and invokes different functional modules to perform features in the eNB. A memory stores program instructions and data to control the operations of the eNB. The eNB also includes several functional modules to carry out some embodiments of the invention.

Embodiments of the current invention improve network efficiency, lower UE battery while maintaining QoS for various applications. In accordance to some of the embodiments, the UE, the eNB and the CN carry out different functions to make the system improvement. In some embodiments of the invention, UE collects information and makes decisions for modification without other network elements' involvement. Yet, in other embodiments of the inventions, an eNB collects information from UE and/or CN, modifies QoS algorithms and sends the modified information to the UE.

Figure 3:
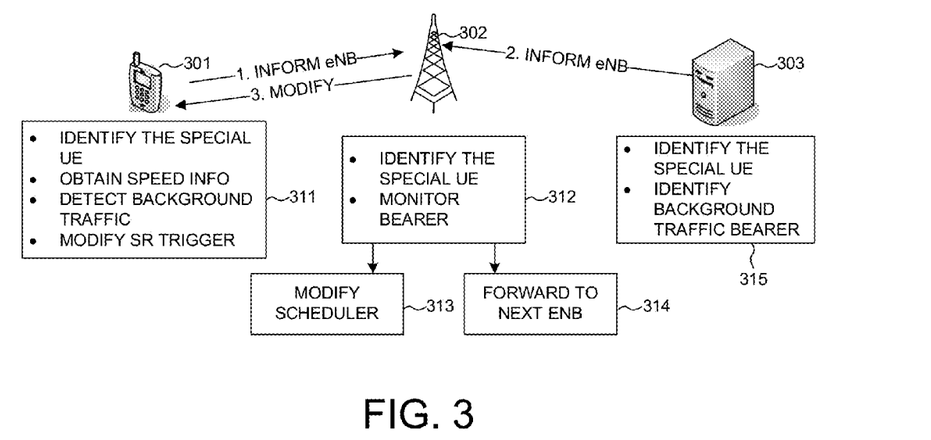
FIG. 3 shows major components of a wireless communication network and exemplary blocks of their corresponding functions in accordance with embodiments of the invention.

FIG. 3 shows major components of a wireless communication network and exemplary blocks of their corresponding functions in accordance with embodiments of the invention. UE 301 connects with eNB 302, which connects with Core Network 303. Function block 311 lists exemplary functions of UE 301 in accordance with some embodiments of the invention. UE 301 may perform functions like identifying the special UE, obtaining speed information; detecting background information; and modifying SR trigger. In some embodiments of the invention, upon detecting certain traffic conditions, UE 301 informs eNB 302 at Step 1. Function block 315 lists exemplary functions of Core Network 303 in accordance with some embodiments of the invention. Core Network 303 may perform functions of identifying the special UE and identifying background traffic for a UE or for a bearer of the UE. Upon detecting certain traffic conditions, Core Network 303 informs eNB 302 at Step 2. Function block 312 lists exemplary functions of eNB 302. eNB 302 may identify the special UE, and monitor the bearer. In accordance with embodiments of the invention, eNB 302 modifies scheduler as listed in function block 313. Upon UE's handover to another target eNB, eNB 302 will forward the UE-related information to the target eNB as listed in function block 314.

FIG. 3 also shows that eNB 302 performs modification of scheduler as in function block 313 based on either output of eNB itself as in function block 312, or by analyzing the information received from UE 301 via Step 1, or by analyzing the information received from CN 303 via Step 2. Further, eNB 302 can modify scheduler as in function block 313 based on one or more of the information mentioned above, from UE 301, detected in eNB 302, or from CN 303. For example, identification of the special UE can be done in UE 301 by collecting idle-active transition count for a predefined period. UE 301 can then identify the UE as special if the count exceeds a threshold. The decision of UE being a special UE can be made at eNB 302 when eNB gathering information from UE 301 and/or CN 303. eNB 302 can collect mobility and idle-active transition information and label the UE. Similarly, Core Network 303, which includes entities like MME, S-GW and P-GW, collects the statistics of the UE and identifies the UE as being a special UE. The statistics collected by CN 303 can be in the granularity of a bearer level.

As shown in FIG. 3, each network entities may carry out some functions in accordance with the embodiments of the invention. Such functions including detecting traffic-related information, such as identifying the special UE or detecting background traffic; modifying QoS algorithms, such as modifying Scheduling Request triggers and DRX; and UE providing speed information to the network so that the network can further optimize performance. The following sections discuss in details of embodiments of the invention.

UE Indication of Traffic-Related Information

The wide spread adoption of Smartphone and the increasing number of downloadable applications continue to drive up the data and signal volume in the mobile network. To utilize the network resources efficiently while maintaining the QoS, a more flexible or dynamic scheme of QoS is desired. Unlike traditional applications, for today's popular mobile applications, QoS requirements may vary for the same application depending on some related traffic conditions. Therefore, the first important issue is to identify and relate such traffic-related information.

Figure 4A:
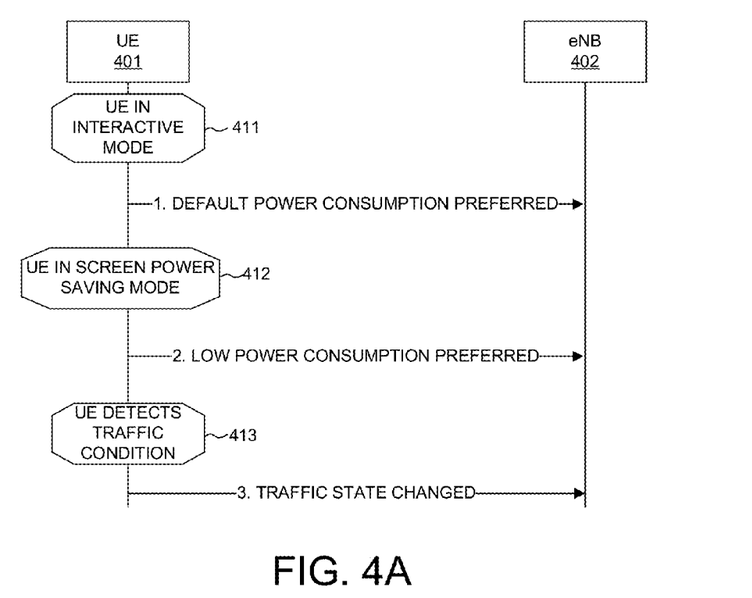
FIG. 4A shows a flow chart of one embodiment of the invention where a UE detects traffic conditions and sends indicators to an eNB.

FIG. 4A shows a flow chart of one embodiment of the invention where a UE detects traffic conditions and sends indicators to an eNB. UE 401 is connected with eNB 402. For some applications, QoS requirement is different for interactive mode from background mode. Therefore, such information detected on UE is very useful for the network to decide whether to adjust QoS policy. At point 411, UE 401 detects that UE 401 is in interactive mode. At Step 1, UE 401 sends an indication to eNB 402 indicating that default power consumption is preferred. Upon receiving it, eNB 402 evaluates whether it needs to adjust the QoS for UE 401. Normally, while UE is in interactive mode, the current QoS for the application would apply and there is no need to modify the existing QoS Requirements. At point 412, however, UE 401 detects that UE enters screen power saving mode, or a specific application runs in background, or a communicating/running application is not shown on UE screen or no interaction from users. While such power saving mode happens, the application is running in background mode. UE 401, thereby, at Step 2, sends eNB 402 an indication indicating that lower power consumption is preferred. eNB 402, upon receiving this indication, understands that the application is running in background mode, and thereby, a modified QoS requirement may be used. By reducing the QoS requirement, Uu efficiency is improved, and UE battery is saved. While the application is running in a background mode, such reduced QoS with longer latencies would be acceptable to a user. At point 413, UE 401 detects some other traffic condition changes. Upon detecting such traffic conditions, at Step 3, UE 401 sends eNB 402 an indication indicating that there exists a traffic state change. In one embodiment of the invention, UE 401 directly sends traffic information to eNB 402. Such traffic information includes packet size(s), average packet size(s), or inter-arrival times.

As shown in FIG. 4A, UE 401 can send traffic-related indication to eNB 402 so that eNB 402 can make decisions whether to reduce or change QoS requirements. Certain traffic condition, background traffic of a specific application, activating of UE screen power saving, a running application is not shown on UE screen, and detecting no interaction from users, is closely related to UE's preferences about its power consumptions. Conceivably, when an application is running in a non-interactive mode, a longer DRX may be used for the background traffic. The purpose of DRX in LTE is to reduce power consumption. As such, an indication of preference of low power consumption is equivalent to a background mode.

Figure 4B:
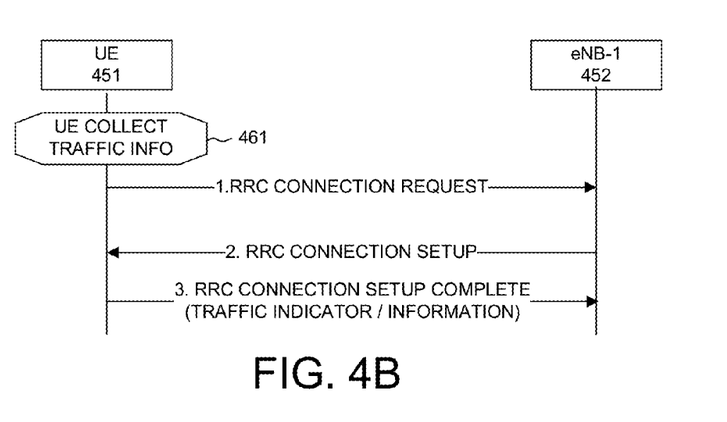
FIG. 4B shows, in accordance with one embodiment of the invention, a UE includes traffic information and/or the indication in messages to eNB at connection setup or Radio Resource Control (RRC) re-establishment.

FIG. 4B shows, in accordance with one embodiment of the invention, a UE includes traffic information and/or the indication in messages to eNB at connection setup or Radio Resource Control (RRC) re-establishment. UE 451 connects with eNB 452. At point 461, UE 451 collects traffic information. Such traffic information includes information such as packet size(s), average packet size(s), and inter-arrival times. At Step 1, UE 451 sends RRC_CONNECTION_REQUEST message to eNB 452. eNB 452, at Step 2, responds with RRC_CONNECTION_SETUP message. UE 451 upon connecting with eNB 452, at Step 3, sends RRC_CONNECTION_SETUP_COMPLETE message to eNB 452. In one embodiment of the invention, based on the history of the traffic information collected, UE 451 transmits a traffic indicator indicates a time pattern of the traffic history. UE 451 includes the traffic indicator in the RRC_CONNECTION_SETUP_COMPLETE message. Such traffic indictors is one or more of: a history of time-periods when the UE was in RRC_IDLE mode or in RRC_CONNECTED mode, a count of transactions between RRC_IDLE mode and RRC_CONNECTED mode, a history of packet inter-arrival times for a radio bearer or a group of radio bearers, a history of packet sizes for a radio bearer or a group of radio bearers. Typically, UE 451 transmits one or more of these indicators at RRC connection establishment, RRC connection re-establishment, or when UE changes cell.

Identifying a traffic condition for certain applications, as shown in FIG. 4, is an important way to trigger modified QoS. In addition to identify applications on each UE, sometimes it is important to identify certain "tricky" UEs. Indeed, in today's wireless network, for internet application, the most sophisticated operators make it simple and discriminate mainly between different subscribers, such as gold, silver and bronze. The operators then bundle all of the category user traffic onto a single bearer. These bearers may have different QCI depending on the subscription of the user. One example of a "tricky" UE is an UE that has "always-on" application running and is moving. Such UE causes large amount of traffic to the Core Network. Successfully identifying such UEs is important. Once identified, operators or the system can apply different QoS to the "tricky" UE.

Figure 5:
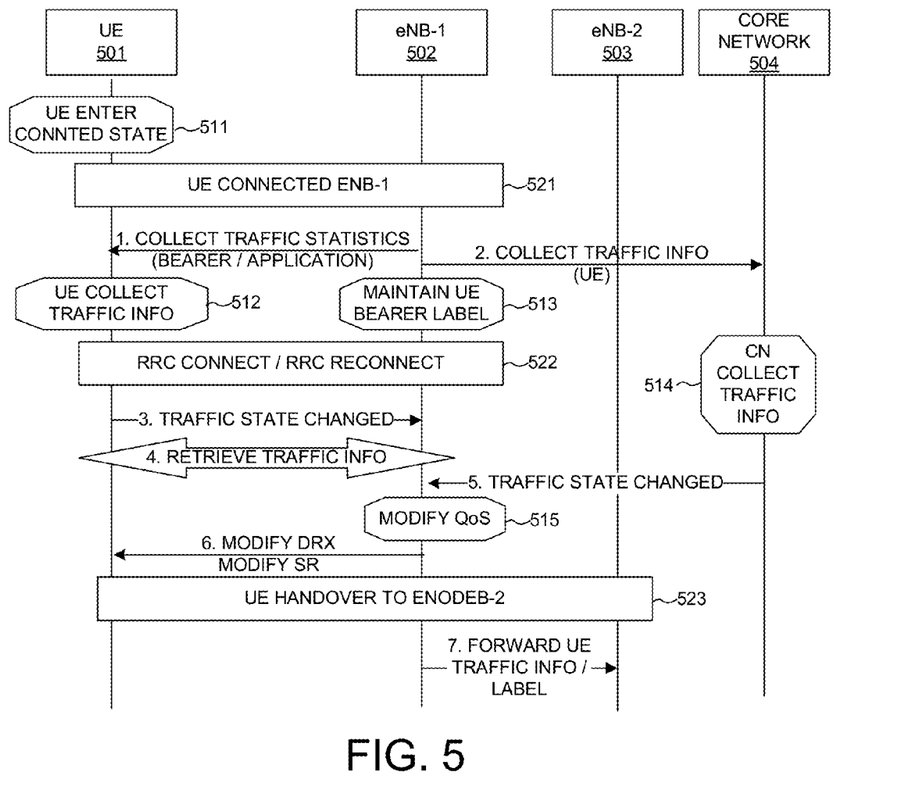
FIG. 5 shows a flow chart of one embodiment of the invention where traffic information is collected by an eNB to identify "tricky" UEs and the eNB modifies the QoS requirements accordingly.

FIG. 5 shows such a scheme. It shows a flow chart of one embodiment of the invention where traffic information is collected by an eNB to identify "tricky" UEs and the eNB modifies the QoS requirements accordingly. UE 501 is connected with eNB-1 502 and Core Network 504. At point 511 UE 501 enters RRC_connected state while connecting with eNB-1 502. Noted in Stage 521, UE 501 is connected with eNB-1 502. In one embodiment of the invention, upon UE 502 entering connected state with eNB-1 502, eNB-1 502, at Step 1, sends a message to UE 501 requesting UE 501 to collect traffic statistics for eNB-1 502. eNB-1 502 may indicate that the statistics collection relates to one or more applications, or specified for certain bearers or both. In one embodiment of the invention, at Step 2, eNB-1 502 also sends a message to Core Network 504 requesting collection of statistics of traffic information for UE 501. eNB-1 502 may, at the same time, maintain a label for UE 501 or labels for certain bearers in UE 501.

At point 512, upon receiving messages at Step 1 from eNB-1 502, UE 501 starts collecting traffic information. UE 501 may collect statistics of idle-active information, such as idle-active transition count for a predefined period. It may also collect average packet size(s), and inter-arrival time and other traffic-related information. UE can also categorize its pattern as one of the predefined pattern. At point 514, upon receiving Step 2 message from eNB-1 502, Core Network 504 starts collecting traffic information. MME, S-GW or P-GW can collect statistics of UE 501. Such statistics can be in the granularity of bearer level. The information is presented as a value of a pre-identified range and pass to eNB-1 502. In one embodiment of the invention, at stage 522, UE 501 establishes or re-establishes RRC Connection with eNB-1 502. Upon such trigger events, such as RRC connection or RRC re-establishment, UE 501 sends traffic indication to eNB-1 502 indicating that there exists traffic information ready to retrieve. In other embodiment of the invention, such indicator can be sent in other occasions or is sent periodically. At Step 4, upon receiving such traffic state changed indication from UE 501, eNB-1 502 retrieves traffic information from UE 501. At Step 5, Core Network 504 may also send traffic information to eNB-1 502.

Upon receiving the traffic information, at point 515, eNB-1 502 uses the information to optimize Uu efficiency of UE 501, such as changing scheduling priority for UE 501. eNB-1 502 may determine to apply a different or relaxed QoS requirement upon detecting or determining one or more of the traffic indictors, such as a traffic history is evaluated to be background traffic or sparse traffic, a low power consumption is preferred. eNB-1 502 can apply at least one of different or relaxed QoS requirement, such as reducing QoS requirement, reducing scheduling priority, setting longer DRX cycle, configuring sparse or no uplink resources, and ordering the UE to go to RRC_IDLE mode. eNB-1 502 restore to a default QoS requirement, where the default QoS requirement is targeted to be satisfied at connection setup and bearer setup. Restoring of default QoS requirement can be trigger upon eNB-1 502 detecting one or more traffic indictors such as the traffic is evaluated to be conversational traffic, interactive traffic, streaming traffic or traffic where significant data volumes are transferred.

In one embodiment of the invention, eNB-1 502 may evaluate the collected traffic information together with some speed information of UE 501 to identify UE 501 as a "tricky" UE. It will then enable operator to apply special algorithms with high complexity to such UEs to reduce the Core Network traffic, while applying simpler algorithms to non-problematic UEs. In embodiment of the invention, at Step 6, eNB-1 502 sends messages to UE 501 to modify Scheduling Request and/or DRX for UE 501. At Stage 523, UE 501 hands over to new target eNB-2 503. Upon handover, at Step 7, eNB-1 502 forwards UE 501's traffic information to eNB-2 503.

Figure 6:
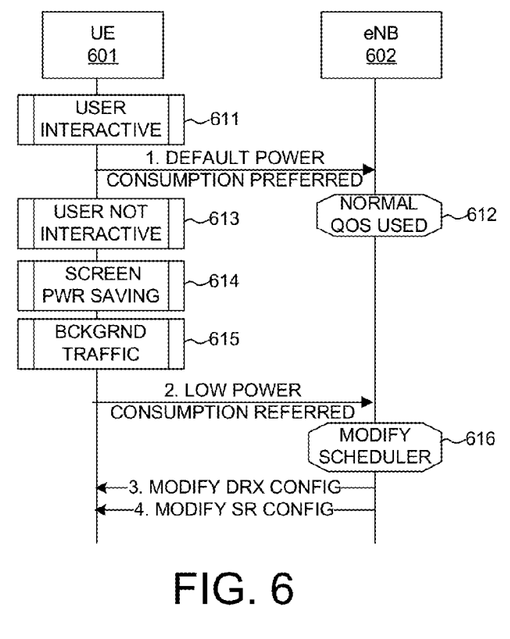
FIG. 6 shows a flow chart of one embodiment of the invention where a UE informs an eNB of its preference for battery consumption level and the eNB adjust the UE's QoS accordingly.

FIG. 6 shows a flow chart of one embodiment of the invention where a UE informs an eNB of its preference for battery consumption level and the eNB adjust the UE's QoS accordingly. UE 601 connects to eNB 602. At point 611, UE 601 detects that UE 601 in interactive mode. At Step 1, UE 601 sends message to eNB 602 indicating default power consumption is preferred. Upon receiving the message, at point 612, eNB 602 set normal QoS use for UE 601. At point 613 UE 601 detects UE 601 is not in interactive mode. At Step 2, UE 602 sends message to eNB 602 indicating that low power consumption is preferred. Similarly, at point 614, UE 602 detects that UE 601 enters screen power saving mode. At Step 2, UE 601 sends message to eNB 602 indicating that low power consumption is preferred. Another event trigger is shown at point 615 when UE 601 detects background traffic. At Step 2, UE 601 sends message to eNB 602 indicating that low power consumption is preferred. Upon receiving message at Step 2, at point 616, eNB 602 modifies scheduler for UE 601. At Step 3 and Step 4, eNB 602 sends modify DRX configuration and modify scheduling request configuration messages to UE 601, respectively. In this scenario, UE 601 collects information and sends it to eNB who makes decision of modifying QoS for UE 601.

Figure 7:
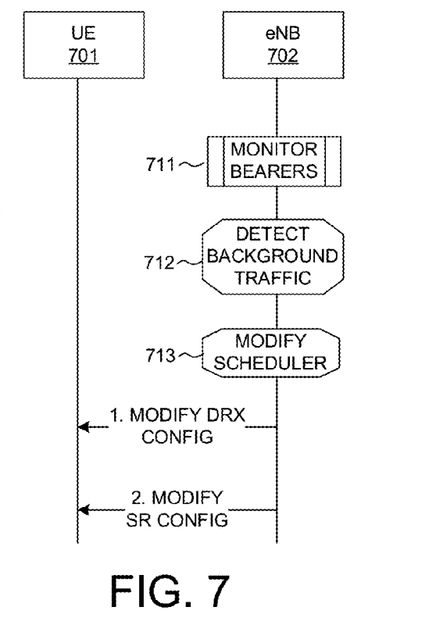
FIG. 7 shows a flow chart of one embodiment of the invention where an eNB monitors UE bearers conditions and modifies QoS upon detecting background traffic on the bearer.

FIG. 7 shows a flow chart of one embodiment of the invention where an eNB monitors UE bearers conditions and modifies QoS upon detecting background traffic on the bearer. UE 701 connects with eNB 702. At point 711, eNB 702 starts to monitor traffic conditions of UE 701 or bearers of UE 701. At point 712, eNB 702 detects background traffic from UE 701. eNB 702, at point 713, modifies UE 701 scheduler accordingly. At Step 1 and Step 2, eNB 702 sends modify DRX configuration and modify scheduling request configuration messages to UE 701, respectively.

Figure 8:
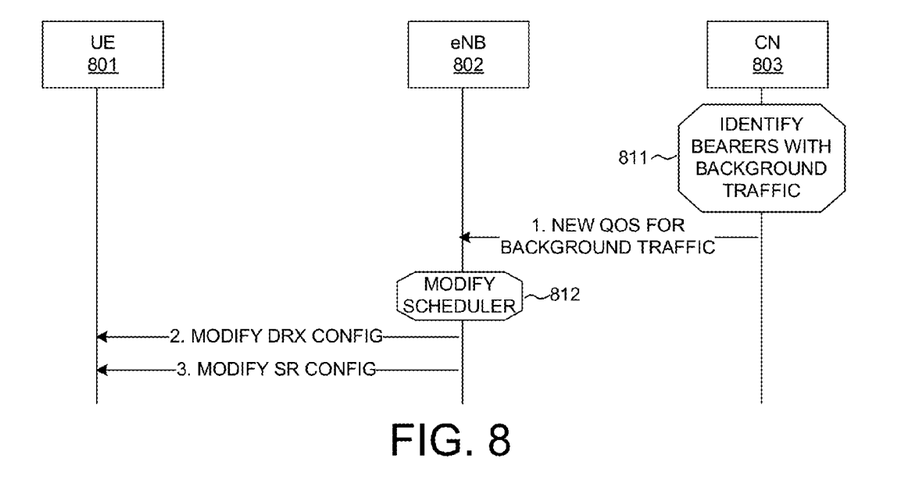
FIG. 8 shows a flow chart of one embodiment of the invention where a Core Network identifies background traffic on UE bearers and an eNB modifies the UE's QoS accordingly.

Besides detecting traffic conditions on eNB, or collecting traffic conditions from UE, Core Network can also provide traffic information. FIG. 8 shows a flow chart of one embodiment of the invention where a Core Network identifies background traffic on UE bearers and an eNB modifies the UE's QoS accordingly. UE 801 connects with eNB 802 and Core Network 803. At point 811, CN 803 identifies bearers with background traffic of UE 801. At Step 1, CN 803 sends new QoS information for UE 801 background traffic to eNB 802. CN 803 detects certain background information by means such as inspection of ip headers. Some of the information may not be readily available to identify background traffic. However, CN 803 can send such information to eNB 802. eNB 802 can then combine the information from CN 803 with other available information to make a decision. Upon receiving this message, eNB 802, at point 812, modifies scheduler. At Step 2 and Step 3, eNB 802 sends modify DRX configuration and modify scheduling request configuration messages to UE 701, respectively.

Figure 9A:
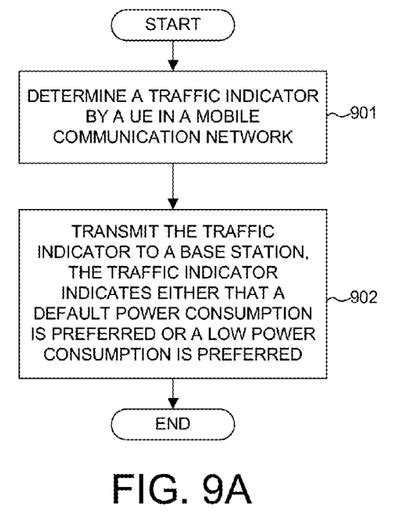
FIG. 9A shows a flow chart of one embodiment of the invention where a UE determines a traffic indicator that is sent to an eNB.

FIG. 9A shows a flow chart of one embodiment of the invention where a UE determines a traffic indicator that is sent to an eNB. At Step 901, the UE determines a traffic indicator. At Step 902, the UE transmits the traffic indicator to a base station. The traffic indicator indicates either that a default power consumption is preferred or a low power consumption is preferred. In one example, for UE in background traffic, low power consumption is preferred.

Figure 9B:
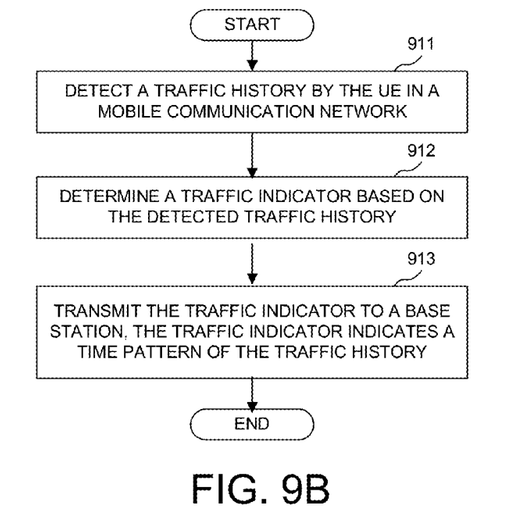
FIG. 9B shows a flow chart of one embodiment of the invention where a UE detects a traffic history and determines a traffic indicator that is sent to an eNB.

FIG. 9B shows a flow chart of one embodiment of the invention where a UE detects a traffic history and determines a traffic indicator that is sent to an eNB. At Step 911, the UE detects a traffic history. At Step 912, the UE determines a traffic indicator based on the traffic history. At step 913, the UE transmits the traffic indicator to a base station. The traffic indicator indicates a time pattern of the traffic history.

Figure 10:
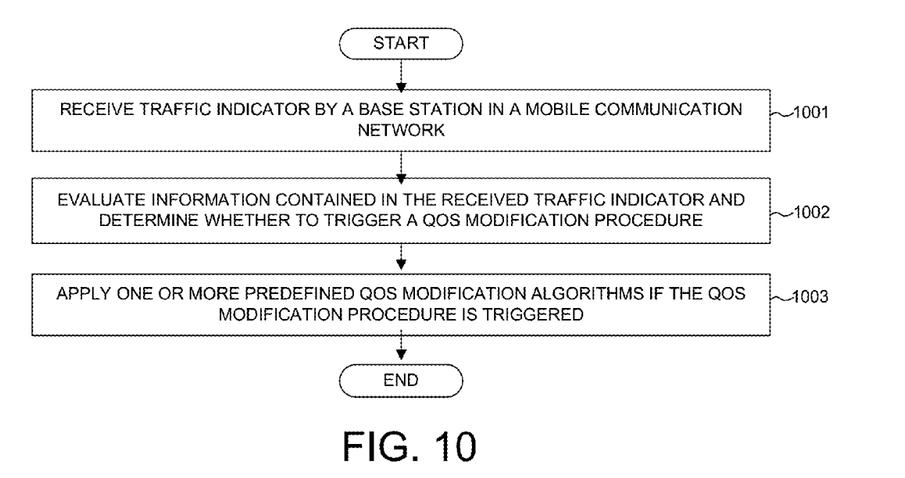
FIG. 10 shows a flow chart of one embodiment of the invention where an eNB receives a traffic indicator, determines whether to trigger a QoS modification, and applies QoS modification algorithms when needed.

FIG. 10 shows a flow chart of one embodiment of the invention where an eNB receives a traffic indicator, determines whether to trigger a QoS modification, and applies QoS modification algorithms when needed. At Step 1001, an eNB receives a traffic indicator. The eNB can receive the information either from a UE or from a Core Network. At Step 1002, the eNB evaluates the received information contained in the traffic indicator and determines whether to trigger a QoS modification procedure. At Step 1003, based on the evaluation at Step 1002, the eNB applies one or more predefined QoS modification algorithms when needed.

Scheduling Request Triggering Based on Traffic

Identifying background traffic and applying modified QoS requirement for such traffic helps improving network efficiency. This section discusses embodiments of the invention that modifies SR trigger for such identified background traffic.

With growing number of chatty applications on the wireless data network, small data sized applications periodically connect and disconnect to/from the network for updates. Each connection/disconnection attempt requires several signal message exchanges between the UE and the eNB. This signaling load is costly overhead. Further, from user's point of view, for background traffic, while user is not looking at the screen and not interacting, power saving should have higher priority than performance. Special handling of these small sized data traffic in background mode helps lowering battery consumption as well as improving network efficiency.

Traditionally, when a data arrives at data buffer, a UE transmits a Scheduling Request (SR) via either a Physical Uplink Control Channel (PUCCH) or a Random Access Channel (RACH). An eNB upon receiving such request would grant resources to the UE. For background traffic, QoS requirements can be relaxed in order to increase network efficiency and lower UE battery consumption. It is, therefore, desirable to design a modified SR trigger algorithm that can aggregate the small requests. The following describes in details some embodiments of the invention that triggers a modified SR based on traffic information.

Figure 11:
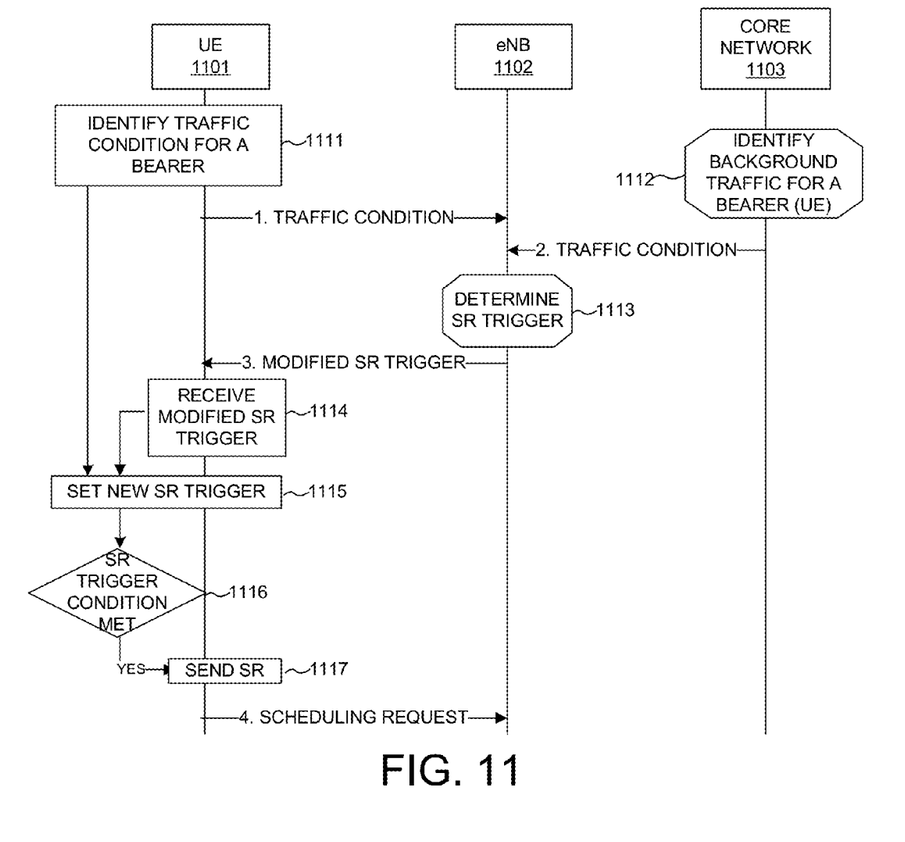
FIG. 11 shows a flow chart, in accordance with embodiments of the invention, where a UE and/or a CN identifies a traffic condition and sends the traffic condition to an eNB, and UE set new Scheduling Request (SR) trigger accordingly.

FIG. 11 shows a flow chart, in accordance with embodiments of the invention, where a UE and/or a CN identifies a traffic condition and sends the traffic condition to an eNB, and UE set new Scheduling Request (SR) trigger accordingly. UE 1101 connects to eNB 1102 and Core Network 1103. At point 1111, UE 1101 identifies traffic condition for a bearer. In one embodiment of the invention, upon identifying background traffic or a predefined traffic condition, UE 1101 moves to point 1115 and set a new SR trigger. In one embodiment of the invention, such new SR trigger is to stop SR during RACH Scheduling Request during background mode. In one embodiment of the invention, upon setting the new SR trigger, UE 1101 configures corresponding SR trigger threshold value. Such SR trigger threshold value is related to prioritized Bit Rate (PBR) and/or bucket Size Duration (BSD).

In another embodiment of the invention, however, UE 1101, upon identifying the traffic condition at point 1111, sends the traffic condition information to eNB 1102 at Step 1. eNB 1102 can also get traffic information from Core Network 1103. At point 1112, Core Network 1103 identifies background traffic for UE 1101, or for one or more bearers of UE 1101. At Step 2, Core Network 1103 sends the traffic condition information to eNB 1102. In one embodiment of the invention, eNB 1102, upon receiving traffic information from UE 1101 and/or Core Network 1103, determines whether to apply a modified SR trigger at point 1113. If eNB 1102 determines that a modified SR trigger is needed, at Step 3, eNB 1102 sends modify SR trigger message to UE 1101. In one embodiment of the invention, eNB sends configured threshold values to UE 1101 together with the modified SR trigger message. The eNB sets the threshold valued based on a size of the smallest grant under the traffic condition. Upon receiving such configured threshold value at UE 1101, it uses the threshold as conditions to trigger SR. At point 1114, upon receiving modify SR message from eNB 1102, UE 1101 set new SR trigger at point 1115. At point 1116, UE 1101 checks to see if the modified SR trigger condition is met. If it is met, at point 1117, UE 1101 sends a Scheduling Request to eNB 1102. The following describes in details some specific embodiment of the modified SR trigger algorithms.

Figure 12A:
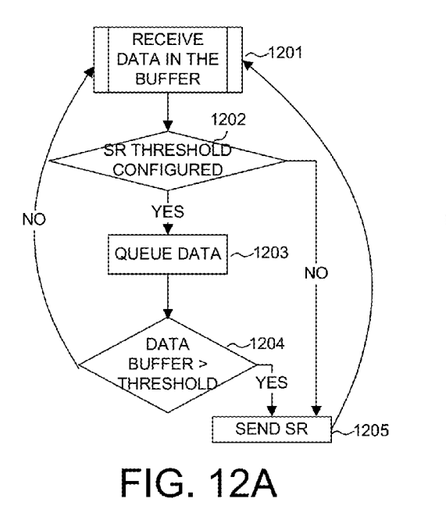
FIG. 12A shows a flow chart of one embodiment of the invention where a UE applying a modified SR trigger, sends SR upon detecting data buffer greater than a threshold.

FIG. 12A shows a flow chart of one embodiment of the invention where a UE applying a modified SR trigger, sends SR upon detecting data buffer greater than a threshold. At Step 1201, a UE receives new data in transmission buffer. At Step 1202, the UE checks if a modified SR trigger threshold is configured. If a modified SR trigger threshold is not configured, which happens when the traffic condition does not points to a condition to trigger SR trigger modification, the UE sends a SR at Step 1205 in traditional way. If at Step 1202, a modified SR trigger threshold is configured, the UE queues the data at Step 1203. At Step 1204, the UE checks whether the current data buffer exceeds a threshold. The threshold, in one embodiment of the invention, is related a QoS requirement, which is related to prioritized Bit Rate (PBR) and/or bucket Size Duration (BSD). In another embodiment of the invention, this threshold is configured by the network. The network sets the threshold valued based on a size of the smallest grant under the traffic condition. The UE upon receiving the configuration updates its threshold value. If at Step 1204, the UE detects the data buffer exceeds the threshold, the UE sends out a SR via PUCCH or RACH. If at Step 1204, the UE detects that the data buffer size does not exceed the threshold, the data is kept in the queue and the UE goes back to Step 1201 to wait for more data to come to the queue so that it can aggregate the data for one single SR.

Figure 12B:
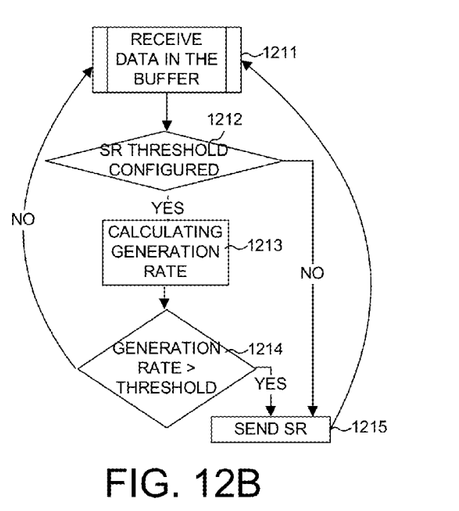
FIG. 12B shows a flow chart of one embodiment of the invention where a UE applying a modified SR trigger, sends SR upon detecting generation rate than a threshold.

FIG. 12B shows a flow chart of one embodiment of the invention where a UE applying a modified SR trigger, sends SR upon detecting generation rate than a threshold. A UE receives data in the buffer at Step 1211. At Step 1212, the UE checks if a modified SR trigger threshold is configured. If a modified SR trigger threshold is not configured, which happens when the traffic condition does not points to a condition to trigger SR modification, UE sends a SR at Step 1215 in traditional way. If at Step 1212, a modified SR trigger threshold is configured, UE calculates a generation rate at Step 1213. The generation rate is an indicator of the UE being in a background mode or interactive mode. At Step 1214, the UE checks whether the generation rate exceeds a threshold. The threshold, in one embodiment of the invention, is related to prioritized Bit Rate (PBR) and/or bucket Size Duration (BSD). In another embodiment of the invention, this threshold is configured by the network. If at Step 1214, the UE detects the generation rate exceeds the threshold, the UE sends out a SR. If at Step 1214, the UE detects that the generation rate does not exceed the threshold, the data is kept in the queue and the UE goes back to Step 1211 to wait for more data to come to the queue so that it can aggregate the data for one single SR. Besides the above noted receiving data can trigger modified SR algorithm, DRX state can also be used for modified SR as shown below.

Figure 13A:
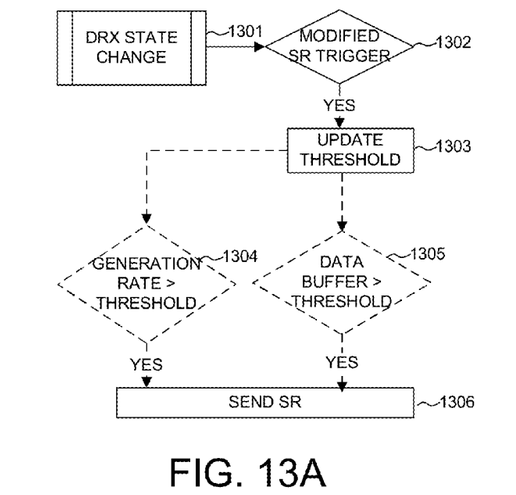
FIG. 13A shows a flow chart in accordance with embodiments of the invention where upon detecting a Discontinuous Reception (DRX) state change, updates a threshold and applies one of the modified SR triggers.

FIG. 13A shows a flow chart in accordance with embodiments of the invention where upon detecting a Discontinuous Reception (DRX) state change, updates a threshold and applies one of the modified SR triggers. At Step 1301, a UE detects DRX state change. At Step 1302, the UE checks if a modified SR should apply. If a modified SR trigger does not apply, which happens when the traffic condition does not points to a condition to trigger SR trigger modification; the UE does not do anything for this state change event. If at Step 1302, a modified SR trigger is required, the UE, at Step 1303, updates the threshold for a modified SR trigger algorithm. A threshold_1 is set for DRX sleep state, and threshold_2 is set for DRX active or onduration state. In one embodiment of the invention, threshold_2 can be zero, which will trigger an immediate sending of SR. Depending on the modified SR trigger algorithms, the UE moves on to either Step 1304 if the UE uses data buffer size as modified SR trigger, or 1305, if the UE uses generation rate as modified SR trigger. At Step 1304, the UE compares the data buffer with the modified threshold. If the data buffer exceeds the modified threshold, the UE, at Step 1306, sends a SR. If at Step 1304, the UE detects that the data buffer does not exceed the modified threshold, no SR is sent until more data comes in the queue. At Step 1305, the UE compares the generation rate with the modified threshold. If the generation rate exceeds the modified threshold, the UE, at Step 1306, sends a SR. If at Step 1305, the UE detects that the generation rate does not exceed the modified threshold, no SR is sent until more data comes in the queue.

Figure 13B:
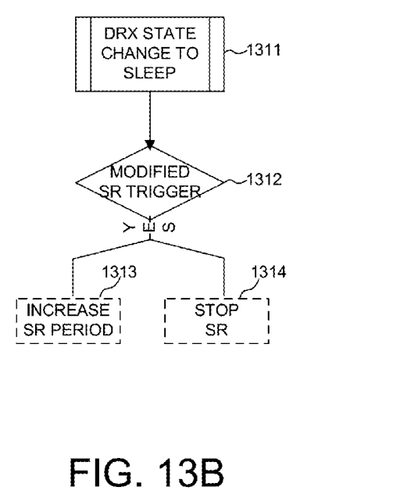
FIG. 13B shows a flow chart of one embodiment of the invention where upon detecting DRX state changes to sleep, a UE applies one of the modified SR algorithms.

FIG. 13B shows a flow chart of one embodiment of the invention where upon detecting DRX state changes to sleep, a UE applies one of the modified SR algorithms. At Step 1311, a UE detects DRX state changes to sleep. At Step 1312, the UE checks if a modified SR trigger should apply. If a modified trigger SR does not apply, which happens when the traffic condition does not points to a condition to trigger SR modification; the UE does not do anything for this state change event. If at Step 1312, a modified SR is required, the UE can either move to Step 1313, which increases SR period or move to Step 1314 which stops SR.

Figure 14:
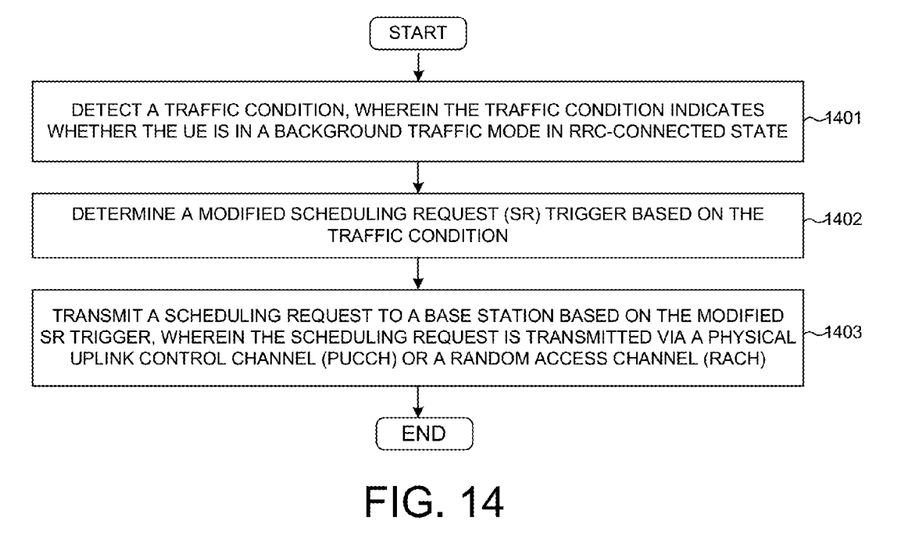
FIG. 14 shows a flow chart of one embodiment of the invention where a UE detects a traffic condition, determines whether to adopt a modified SR trigger, and transmits a SR to an eNB once the modified triggered is met.

FIG. 14 shows a flow chart of one embodiment of the invention where a UE detects a traffic condition, determines whether to adopt a modified SR trigger, and transmits a SR to an eNB once the modified triggered is met. At Step 1401, a UE detects a traffic condition, wherein the traffic condition indicates whether the UE is in a background traffic mode in RRC_Connected state. At Step 1402, the UE determines whether a modified Scheduling Request trigger should be used based on the traffic condition. At Step 1403, the UE transmits a Scheduling Request to an eNB based on the modified SR trigger when needed. Such modified SR trigger is either data buffer exceeds a predefined threshold or a generation rate exceeds a predefined threshold.

Figure 15:
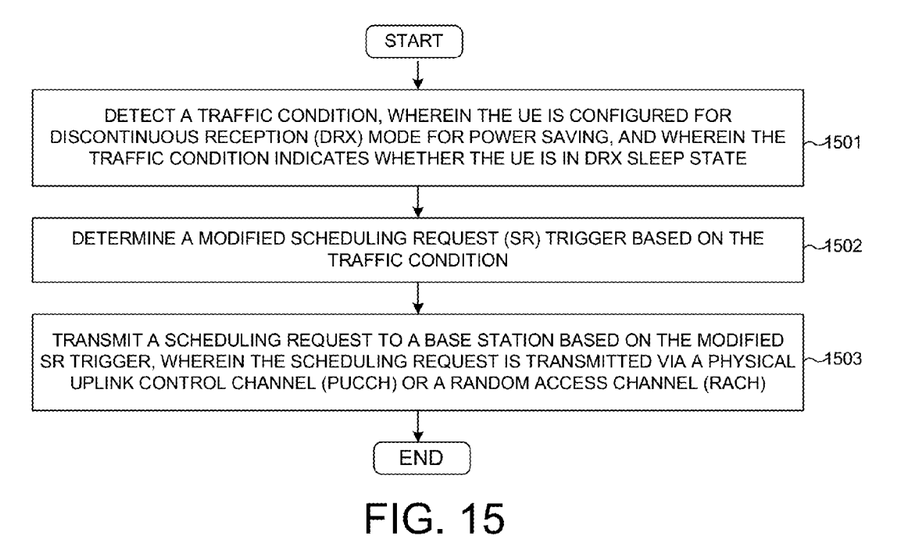
FIG. 15 is a flow chart in accordance with one aspect of the invention, where a UE detects a traffic condition of DRX mode for power saving, determines a modified SR trigger based on the condition, and transmits a SR to an eNB based on the modified SR trigger.

FIG. 15 is a flow chart in accordance with one aspect of the invention, where a UE detects a traffic condition of DRX mode for power saving, determines a modified SR trigger based on the condition, and transmits a SR to an eNB based on the modified SR trigger. At Step 1501, a UE detects a traffic condition, wherein the UE is configured in DRX mode for power saving and the traffic condition indicates whether the UE is in DRX sleep state. At Step 1502, the UE determines whether a modified SR trigger should be used based on the traffic condition. At Step 1503, the UE transmits a SR to an eNB based on the modified SR trigger, wherein the SR is transmitted via PUCCH or RACH.

UE Provides Speed Information to Network

Another area to improve network efficiency is to reduce network overhead by preventing frequent handover. An important parameter to identify potential frequent handover UEs is the UE's speed information. Currently, most UEs can calculate its speed and obtain its own speed information. Such information, however, is quite useful to the network. For example, the network can release high speed UE and rely on idle mobility. This way data traffic due to handover to the network can be reduced. Another example is to keep qualified UE in connected state longer, based on the speed information obtained by the network. In some cases, when the network based on the speed information detects that the UE is moving in high speed and only have background traffic, the network can send such UE to idle faster to avoid handover load.

Figure 16:
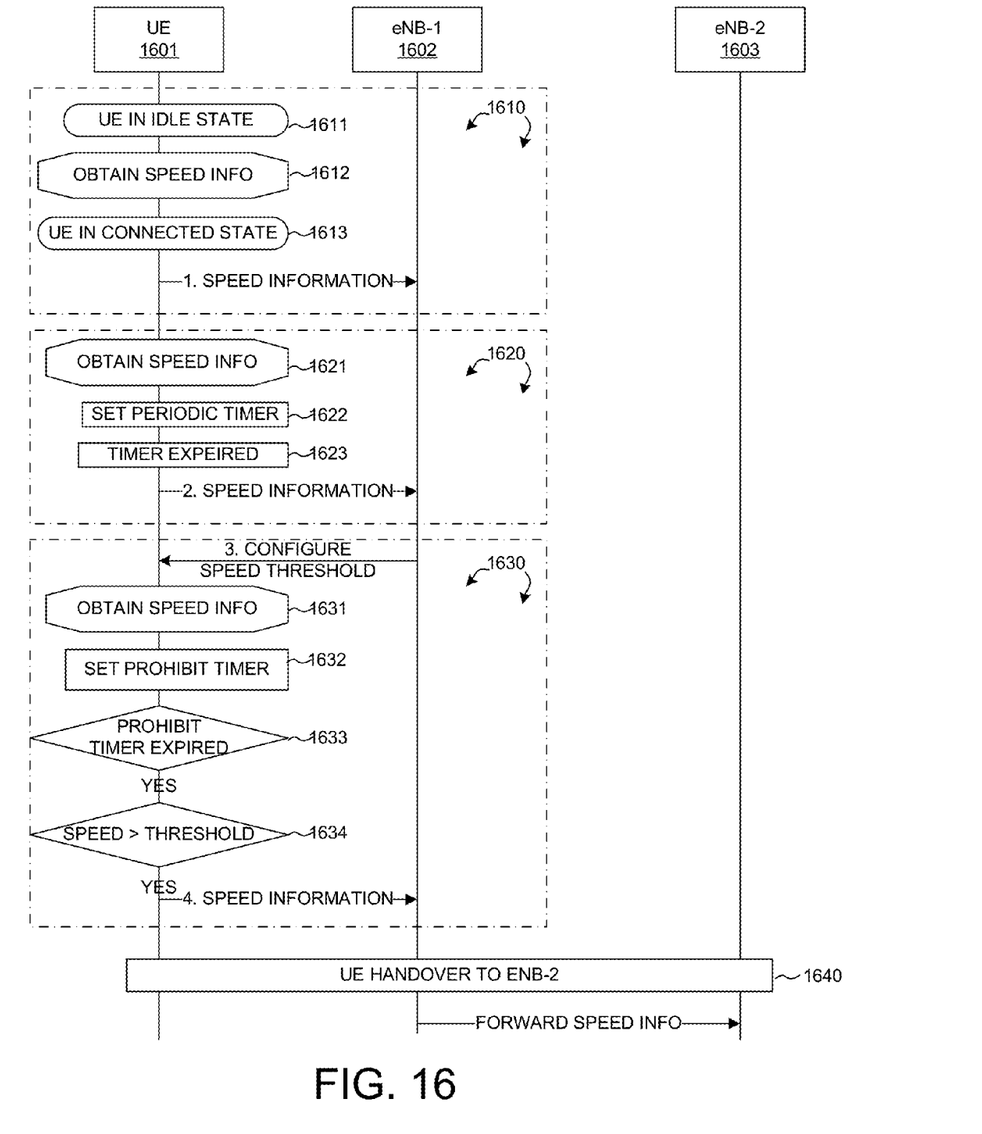
FIG. 16 shows a flow chart in accordance with embodiments of the invention where speed information is collected and sent to an eNB.

FIG. 16 shows a flow chart in accordance with embodiments of the invention where speed information is collected and sent to an eNB. The speed can be physical speed, a physical speed mapped on a pre-defined speed group or virtual speed. The pre-defined speed group consist different speed group, such as high-speed group wherein the UE speed is greater than threshold_1; medium-speed group wherein the UE speed is smaller than threshold_1 and greater than threshold_2; and low-speed group wherein the UE speed is smaller than threshold_2. Virtual speed comprises a cell change count or a number of cells that the UE has requested RRC connection during a certain period. Flow chart 1610, 1620 and 1630 show several embodiments of the invention that trigger such speed information sending to an eNB from a UE.

In one embodiment of the invention, as shown in flow chart 1610 in FIG. 16, a capable UE sends speed information to eNB upon entering connected state. At point 1611, UE 1601 is in idle state. At point 1612, UE 1601 collects speed information. At point 1613, UE 1601 enters connected state, i.e. RRC connection or RRC re-establishment. Upon going from idle to connected state, UE 1601, at Step 1, sends speed information to eNB-1 1602.

In another embodiment of the current invention, UE 1601 sends speed information to eNB-1 1602 periodically based on a periodic timer. As shown in flow chart 1620 in FIG. 16, at 1621, UE 1601 obtains speed information. At point 1622, UE 1601 sets a periodic timer. At point 1623, the periodic timer expires. Upon expiration of the periodic timer, at Step 2, UE 1601 sends its speed information to eNB-1 1602.

In another embodiment of the invention, UE 1601 sends speed information based on predefined trigger events, such as UE 1601's speed exceeds a predefined threshold. As shown in flow chart 1630 in FIG. 16, in one embodiment of the invention, at Step 3, eNB-1 1602 sends message to UE 1601 to configure a speed threshold. At point 1631, UE 1602 obtains speed information. To prevent frequent update of speed information from UE 1601 to eNB-1 1602, in one embodiment of the invention, UE 1601 sets a prohibit timer at point 1632. UE 1601, at point 1633, checks whether the prohibit timer expires. If the timer has not expired, there is no action from UE 1601, even if the speed trigger presents. At point 1634, upon expiration of prohibit timer, UE 1601 checks whether its speed exceeds the configured speed threshold. If UE 1601's speed exceeds the configured speed threshold at Step 4, UE 1601 sends the speed information to eNB-1 1602.

At stage 1640, UE 1601 hands over to target eNB-2 1603. Upon UE handover, at Step 5, eNB-1 1602 forwards UE 1601's speed information to eNB-2 1603.

At steps where UE 1601 sends the speed information to eNB 1602, UE 1601 can use a predefined means. Such predefined means includes, RRC connection establishment, RRC connection re-establishment, a new RRC message or a new IE in RRC measurement report.

It is further noticed that the most value usage of the speed information in for UE running background traffic. Therefore, the triggers of flow chart 1620 and 1630 can be further conditioned on detecting background traffic to trigger the sending of the speed information. An indicator from UE indicating low power consumption is preferred is related with background traffic condition. Thereby, an indicator of low power consumption being preferred can also trigger sending of the speed information.

Figure 17A:
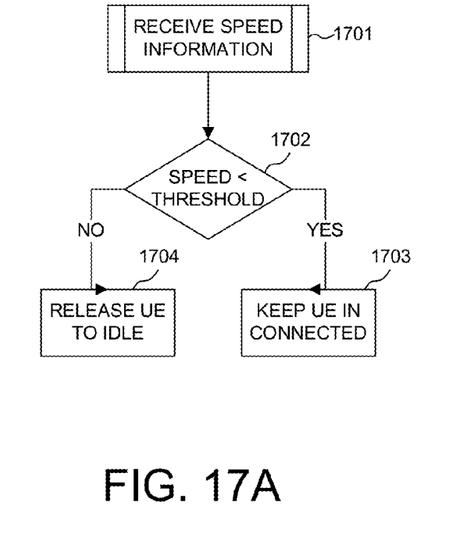
FIG. 17A shows a flow chart in accordance with one embodiment of the invention where an eNB keeps a non-moving UE in connected state longer.
Figure 17B:
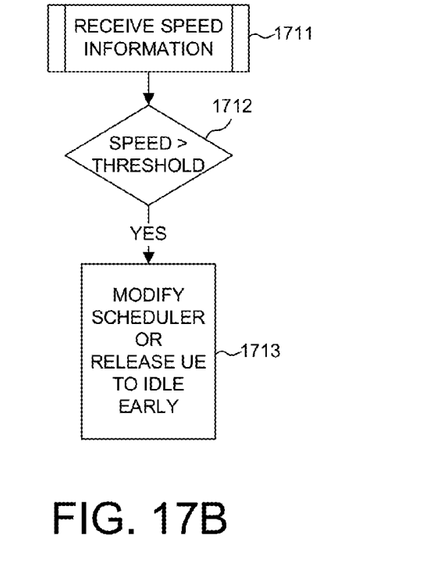
FIG. 17B shows a flow chart in accordance with one embodiment of the invention where an eNB releases a moving UE to idle state faster.

Once an eNB receives the speed information of a UE, it can optimize its process to avoid frequent handovers. FIG. 17A and FIG. 17B show two exemplary embodiments of the invention.

FIG. 17A shows a flow chart in accordance with one embodiment of the invention where an eNB keeps a non-moving UE in connected state longer. At Step 1701, an eNB receives speed information from an UE. At Step 1702, the eNB checks to see if the UE's speed is smaller than a predefined speed threshold. If the UE's speed is less than the predefined speed threshold, the eNB, at Step 1703, keeps the UE in connected state. If the UE's speed is greater than the predefined speed threshold, the eNB, at Step 1704, releases the UE to idle state.

FIG. 17B shows a flow chart in accordance with one embodiment of the invention where an eNB releases a moving UE to idle state faster. At Step 1711, an eNB receives speed information from an UE. At Step 1712, the eNB checks to see if the UE's speed is greater than a predefined speed threshold. If the UE's speed is greater than the predefined speed threshold, the eNB, at Step 1713, the eNB either modifies the scheduler or releases the UE to idle state early.

Figure 18:
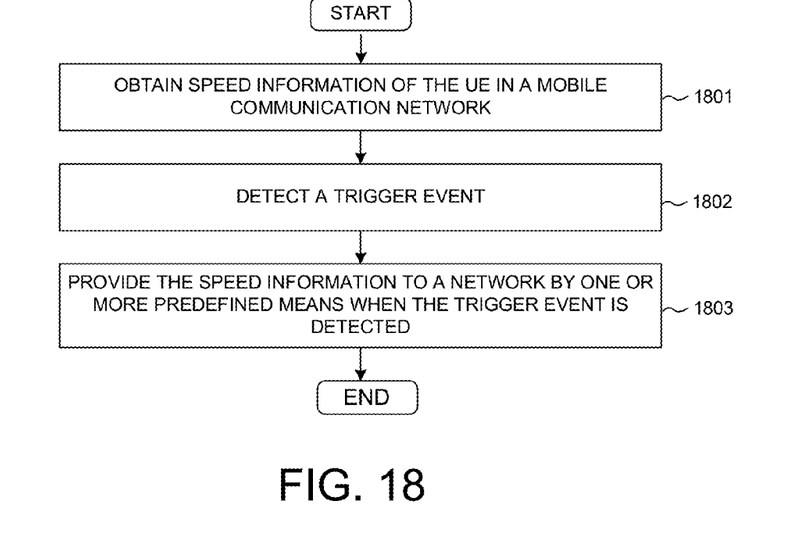
FIG. 18 shows a flow chart in accordance with one embodiment of the invention, where a UE obtains speed information, detects a trigger event and provides the speed information to a network by one or more predefined means.

FIG. 18 shows a flow chart in accordance with one embodiment of the invention, where a UE obtains speed information, detects a trigger event and provides the speed information to a network by one or more predefined means. At Step 1801, a UE obtains speed information of the UE in a mobile communication network. At Step 1802, the UE detects a trigger event. A typical trigger event may be the UE changing from idle state to connected state, or an expiration of a periodic timer, or some triggering events happening. At Step 1803, the UE provides the speed information to a network by one or more predefined means when the trigger event is detected.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE), comprising:
   detecting a traffic history by the UE in a mobile communication network;
   determining a traffic indicator based on the detected traffic history; and
   transmitting the traffic indicator to a base station, wherein the traffic indicator indicates a time pattern of the traffic history, and wherein the traffic indicator comprises a history of time-periods when the UE was in RRC_IDLE mode or in RRC_CONNECTED mode.

2. The method of claim 1, wherein the traffic indicator comprises a count of transactions between RRC_IDLE mode and RRC_CONNECTED mode.

3. The method of claim 1, wherein the traffic indicator comprises a history of packet inter-arrival times for a radio bearer or a group of radio bearers.

4. The method of claim 3, wherein the traffic indicator further comprises a history of packet sizes for a radio bearer or a group of radio bearers.

5. The method of claim 1, wherein the UE transmits the traffic indicator to the base station at RRC connection establishment, at RRC connection re-establishment, or when the UE changes cell.

6. A User Equipment (UE), comprising:
   a traffic detection module that detects a traffic history by the UE in a mobile communication network;
   a traffic indication module that determines a traffic indicator based on the detected traffic history; and
   a transmitter that transmits the traffic indicator to a base station, wherein the traffic indicator indicates a time pattern of the traffic history, wherein the traffic indicator comprises a history of time-periods when the UE was in RRC_IDLE mode or in RRC_CONNECTED mode.

7. The UE of claim 6, wherein the traffic indicator comprises a count of transactions between RRC_IDLE mode and RRC_CONNECTED mode.

8. The UE of claim 6, wherein the traffic indicator comprises a history of packet inter-arrival times for a radio bearer or a group of radio bearers.

9. The UE of claim 8, wherein the traffic indicator further comprises a history of packet sizes for a radio bearer or a group of radio bearers.

10. The UE of claim 6, wherein the UE transmits the traffic indicator to the base station at RRC connection establishment, at RRC connection re-establishment, or when the UE changes cell.

\* \* \* \* \*